US010692409B2

(12) United States Patent
Chiba

(10) Patent No.: US 10,692,409 B2
(45) Date of Patent: Jun. 23, 2020

(54) INFORMATION PROCESSING APPARATUS, INFORMATION PROCESSING METHOD, AND COMPUTER PROGRAM PRODUCT FOR ARRANGING A PLANAR IMAGE IN A FULL-SPHERICAL PANORAMIC IMAGE OBTAINED BY IMAGING AN OMNIDIRECTIONAL RANGE

(71) Applicant: Taketo Chiba, Tokyo (JP)

(72) Inventor: Taketo Chiba, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 12 days.

(21) Appl. No.: 15/712,285

(22) Filed: Sep. 22, 2017

(65) Prior Publication Data
US 2018/0012529 A1    Jan. 11, 2018

Related U.S. Application Data

(63) Continuation of application No. PCT/JP2016/061059, filed on Apr. 5, 2016.

(30) Foreign Application Priority Data

Apr. 6, 2015 (JP) .................................. 2015-077766

(51) Int. Cl.
*G06T 3/00* (2006.01)
*G09G 3/00* (2006.01)
(Continued)

(52) U.S. Cl.
CPC ............... *G09G 3/003* (2013.01); *G06K 9/32* (2013.01); *G06T 3/005* (2013.01); *G06T 3/0062* (2013.01);
(Continued)

(58) Field of Classification Search
CPC ................................. G09G 3/003; G06T 3/005
See application file for complete search history.

(56) References Cited

U.S. PATENT DOCUMENTS

| 6,201,881 B1 | 3/2001 | Masuda et al. |
| 6,317,127 B1 | 11/2001 | Daily et al. |

(Continued)

FOREIGN PATENT DOCUMENTS

| CN | 102129717 A | 7/2011 |
| EP | 0838787 A2 | 4/1998 |

(Continued)

OTHER PUBLICATIONS

International Search Report dated Jun. 28, 2016 in PCT/JP2016/061059 filed Apr. 5, 2016.

(Continued)

*Primary Examiner* — Mark K Zimmerman
*Assistant Examiner* — Jonathan M Cofino
(74) *Attorney, Agent, or Firm* — Harness, Dickey & Pierce, P.L.C.

(57) ABSTRACT

An information processing apparatus configured to paste a full-spherical panoramic image along an inner wall of a virtual three-dimensional sphere; calculate an arrangement position for arranging a planar image closer to a center point of the virtual three-dimensional sphere than the inner wall, in such an orientation that a line-of-sight direction from the center point to the inner wall and a perpendicular line of the planar image are parallel to each other, the planar image being obtained by pasting an embedding image to be embedded in the full-spherical panoramic image, on a two-dimensional plane; and display a display image on a display unit. The display image is a two-dimensional image viewed from the center point in the line-of-sight direction in a state in which the full-spherical panoramic image is pasted along the (Continued)

inner wall of the virtual three-dimensional sphere and the planar image is arranged at an arrangement position.

11 Claims, 14 Drawing Sheets

(51) Int. Cl.
| | |
|---|---|
| *H04N 5/272* | (2006.01) |
| *H04N 5/225* | (2006.01) |
| *H04N 5/262* | (2006.01) |
| *G06K 9/32* | (2006.01) |
| *G06T 5/00* | (2006.01) |
| *G06T 5/50* | (2006.01) |
| *G06T 15/20* | (2011.01) |
| *H04N 5/232* | (2006.01) |

(52) U.S. Cl.
CPC .............. *G06T 5/006* (2013.01); *G06T 5/50* (2013.01); *G06T 15/205* (2013.01); *H04N 5/2258* (2013.01); *H04N 5/2628* (2013.01); *H04N 5/272* (2013.01); *G06T 2207/20221* (2013.01); *G06T 2215/06* (2013.01); *H04N 5/23238* (2013.01)

(56) References Cited

U.S. PATENT DOCUMENTS

| | | | |
|---|---|---|---|
| 2014/0210940 A1* | 7/2014 | Barnes | H04N 5/23293 348/36 |
| 2015/0077416 A1* | 3/2015 | Villmer | G02B 27/017 345/419 |

FOREIGN PATENT DOCUMENTS

| | | |
|---|---|---|
| JP | 10-334272 | 12/1998 |
| JP | 2004-214830 | 7/2004 |
| JP | 2007-089111 | 4/2007 |
| JP | 2013-198062 | 9/2013 |
| JP | 2014-165764 | 9/2014 |

OTHER PUBLICATIONS

Written Opinion of the International Searching Authority PCT/ISA/237 for International Application No. PCT/JP2016/061059 dated Jun. 28, 2016.
Extended European Search Report dated Feb. 20, 2018.
Chinese Office Action dated Jul. 3, 2019.

* cited by examiner

INFORMATION PROCESSING APPARATUS, INFORMATION PROCESSING METHOD, AND COMPUTER PROGRAM PRODUCT FOR ARRANGING A PLANAR IMAGE IN A FULL-SPHERICAL PANORAMIC IMAGE OBTAINED BY IMAGING AN OMNIDIRECTIONAL RANGE

CROSS-REFERENCE TO RELATED APPLICATIONS

The present application is a continuation application of International Application No. PCT/JP2016/061059, filed Apr. 5, 2016, which claims priority to Japanese Patent Application No. 2015-077766, filed Apr. 6, 2015. The contents of these applications are incorporated herein by reference in their entirety.

BACKGROUND OF THE INVENTION

1. Field of the Invention

The present invention relates to an information processing apparatus, an information processing method, and a computer program product.

2. Description of the Related Art

A technology to paste and display a full-spherical panoramic image obtained by imaging an omnidirectional range, on an inner wall of a virtual three-dimensional sphere has been disclosed.

Furthermore, a technology to embed and display various images indicating a date and time, a creator, a version, or the like in the full-spherical panoramic image has been disclosed.

However, conventionally, when other images are embedded in a full-spherical panoramic image, embedding images having been embedded are displayed such that the embedding images are distorted along a three-dimensional sphere.

SUMMARY OF THE INVENTION

According to one aspect of the present invention, an information processing apparatus includes a pasting unit, an acquiring unit, a generating unit, a calculating unit, and a display control unit. The pasting unit is configured to paste a full-spherical panoramic image obtained by imaging an omnidirectional range, along an inner wall of a virtual three-dimensional sphere arranged in a virtual three-dimensional space. The acquiring unit is configured to acquire an embedding image to be embedded in the full-spherical panoramic image. The generating unit is configured to generate a planar image obtained by pasting the embedding image on a two-dimensional plane. The calculating unit is configured to calculate an arrangement position for arranging the planar image closer to a center point of the virtual three-dimensional sphere than the inner wall, in such an orientation that a line-of-sight direction from the center point to the inner wall and a perpendicular line of the planar image are parallel to each other the display control unit is configured to display a display image on a display unit, the display image being obtained by converting a state in which the full-spherical panoramic image is pasted along the inner wall of the virtual three-dimensional sphere and the planar image is arranged at the arrangement position, to a two-dimensional image viewed from the center point in the line-of-sight direction.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
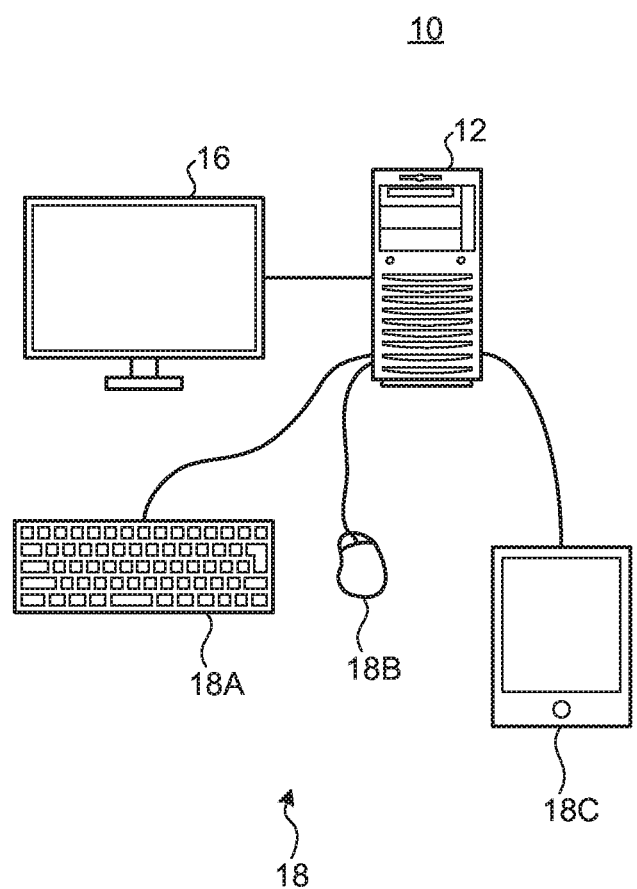
FIG. 1 is a schematic diagram of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Embodiments of the present invention will be described below.

FIG. 1 is a schematic diagram of an information processing system 10 according to an embodiment.

The information processing system 10 includes an information processing apparatus 12, a display unit 16, and an operating unit 18. The information processing apparatus 12, the display unit 16, and the operating unit 18 are communicably connected to one another via a wireless or wired communication unit, such as a network.

In the communication unit, for example, a short-range wireless technology, a wireless communication network using a mobile communication system, the Internet, or the like is used. Examples of the short-range wireless technology include Bluetooth (registered trademark). Examples of the wireless communication network using a mobile communication system include third generation (3G) and Worldwide Interoperability for Microwave Access (WiMAX).

The display unit 16 is a commonly used display device for displaying an image. For example, a liquid crystal display, an organic electroluminescent (EL) display, or the like may be used.

The operating unit 18 has a function to receive various operation instructions from a user. In the example illustrated in FIG. 1, the operating unit 18 includes a keyboard 18A, a mouse 18B, and a user interface (UI) unit 18C.

The UI unit 18C is a device that has a touch panel function to receive input of an operation from a user and display various images. That is, the UI unit 18C has a function of a display unit.

As the UI unit 18C, for example, a computer, such as a smartphone, a tablet terminal, a notebook personal computer, a desktop personal computer, or a personal data assistant (PDA), is used. The UI unit 18C and the information processing apparatus 12 are illustrated to be connected by wire in FIG. 1, but may be connected wirelessly. Specifically, in the case of a wireless connection, it may be possible to provide the information processing apparatus 12 on the Internet and cause the UI unit 18C to operate the information processing apparatus 12 to perform editing over a network.

In the embodiment, a case in which a smartphone or a tablet terminal is used as the UI unit 18C will be described; however, any configuration with a touch panel function is applicable.

The information processing system 10 may include other kinds of operating units rather than the keyboard 18A, the mouse 18B, and the UI unit 18C, or may further include a plurality of imaging devices 14.

The information processing apparatus 12 is a computer that performs display and editing of material. In the embodiment, the information processing apparatus 12 controls display of an image on the display unit 16 or the UI unit 18C.

If the UI unit 18C is a computer, such as a smartphone or a tablet terminal, the functions of the information processing apparatus 12 may be implemented in the UI unit 18C.

In the embodiment, the information processing apparatus 12 displays a full-spherical panoramic image on the display unit 16 or the UI unit 18C.

The full-spherical panoramic image is a panoramic image obtained by imaging a full-spherical (360-degree omnidirectional) range. In other words, the full-spherical panoramic image is a panoramic image obtained by obtaining an image in a solid angle of $4\pi$ steradian and imaging a full-spherical range. The panoramic image is an image with an angle of view wider than an aspect ratio of a display device on which the image is finally output.

In the following, for simplicity of explanation, a case in which the information processing apparatus 12 displays a full-spherical panoramic image on the display unit 16, will be described. However, the information processing apparatus 12 may display a full-spherical panoramic image on the UI unit 18C. Furthermore, if the UI unit 18C has the functions of the information processing apparatus 12, the UI unit 18C displays a full-spherical panoramic image on a display unit provided on the UI unit 18C.

For example, the information processing apparatus 12 may store a full-spherical panoramic image in a storage unit in advance, and acquire the full-spherical panoramic image from the storage unit. For another example, the information processing apparatus 12 may acquire a full-spherical panoramic image from an imaging device.

Figure 2A:
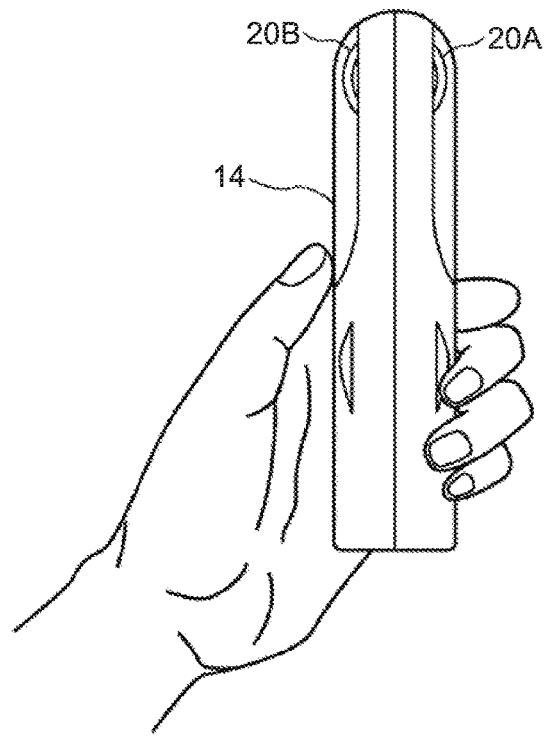
FIG. 2A is a schematic view of an exterior of an imaging device.
Figure 2B:
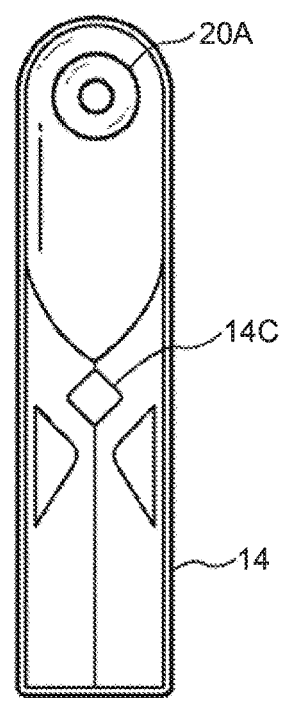
FIG. 2B is a schematic view of the exterior of the imaging device.
Figure 2C:
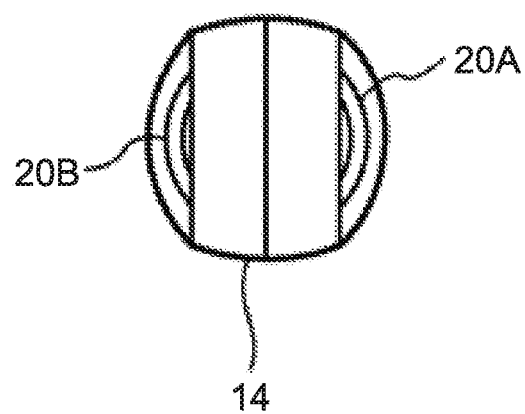
FIG. 2C is a schematic view of the exterior of the imaging device.

An imaging device that captures a full-spherical panoramic image will be described. FIG. 2 (FIG. 2A to FIG. 2C) are schematic views of an exterior of the imaging device 14. FIG. 2A is a side view of the imaging device 14. FIG. 2B is a side view of the imaging device 14 on the side opposite to FIG. 2A. FIG. 2C is a plan view of the imaging device 14.

As illustrated in FIG. 2A, the imaging device 14 has a size that allows a person to hold the imaging device 14 in one hand, for example. The size of the imaging device 14 is not limited to this example. The imaging device 14 is an imaging device that obtains a full-spherical panoramic image.

As illustrated in FIG. 2 (FIG. 2A to FIG. 2C), in an upper part of the imaging device 14, a lens 20A is provided at a front side (at one surface side) and a lens 20B is provided at a back side (at the other surface side). An image is conducted through each of the wide-angle lenses with an angle of view of 180 degrees or greater, and the image is formed on each of imaging elements. Examples of the imaging elements include a charge coupled device (CCD) and a complementary metal-oxide semiconductor (CMOS). Furthermore, as illustrated in FIG. 2B, an operating unit 14C, such as a shutter button, is provided at the front side of the imaging device 14.

As the imaging device 14 that obtains a full-spherical panoramic image, an imaging device described in Japanese Patent Application Laid-open No. 2014-165764 may be used, for example.

Figure 3:
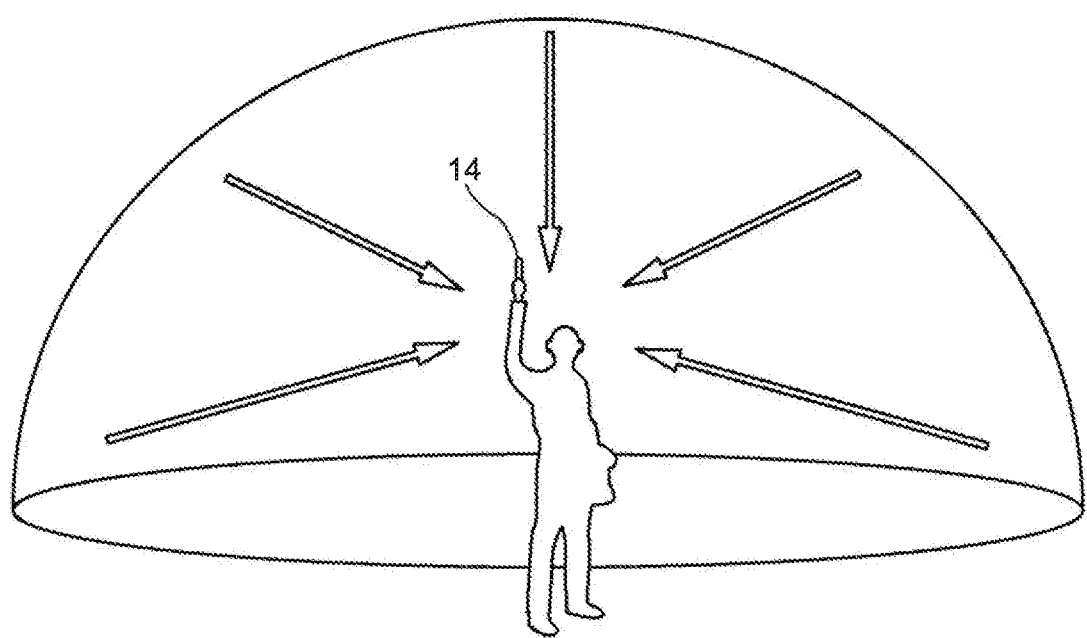
FIG. 3 is a view illustrating an example of usage of the imaging device.

Next, with reference to FIG. 3, an example of usage of the imaging device 14 will be described. FIG. 3 is a view illustrating an example of the usage of the imaging device 14. As illustrated in FIG. 3, the imaging device 14 is held in the hand of a user to image objects around the user. In this case, the imaging elements captures images conducted through the lens 20A and the lens 20B to image the objects around the user, so that two hemispherical images are obtained and an image in the solid angle of $4\pi$ steradian is obtained.

Figure 4A:
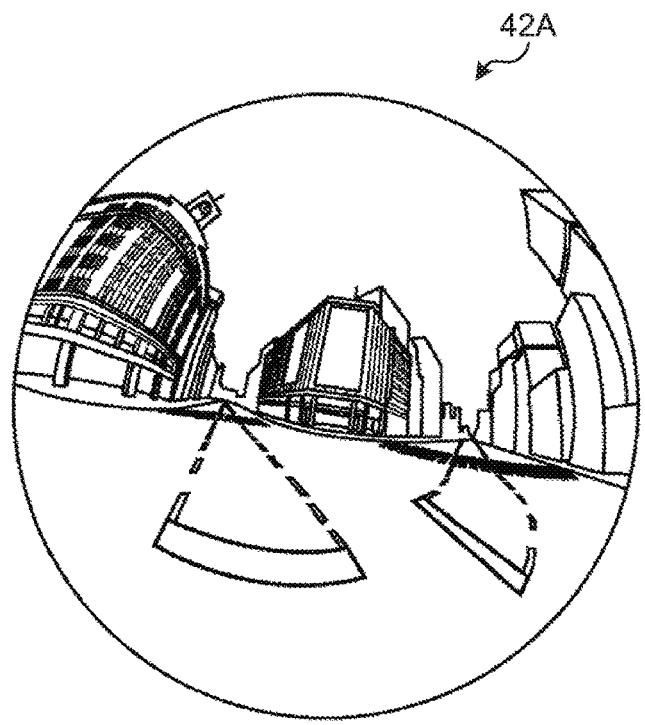
FIG. 4A is a view for explaining an image captured by the imaging device.
Figure 4B:
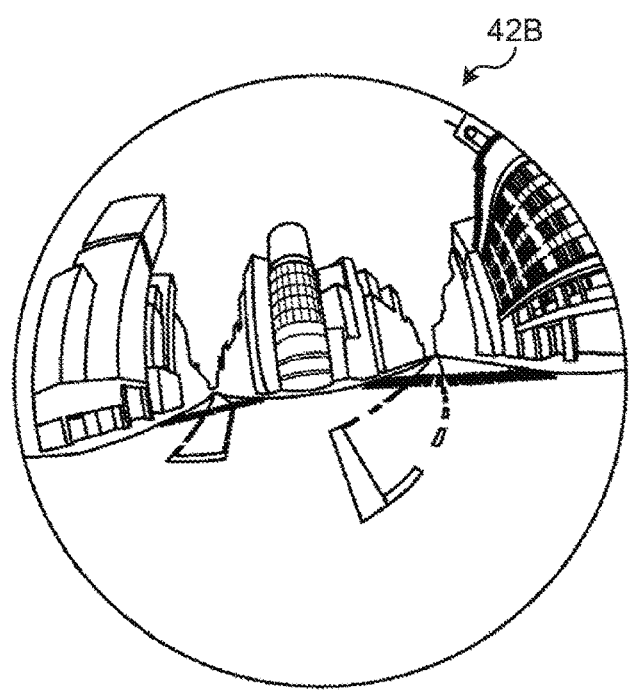
FIG. 4B is a view for explaining an image captured by the imaging device.
Figure 4C:
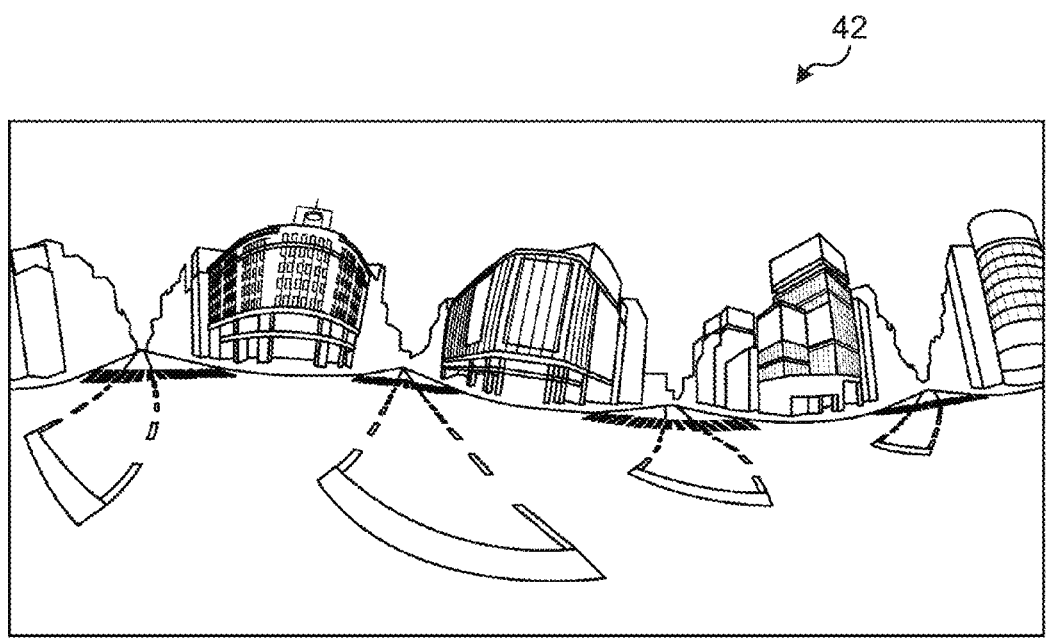
FIG. 4C is a view for explaining an image captured by the imaging device.

Next, with reference to FIG. 4, an image captured by the imaging device 14 will be described. FIG. 4 (FIG. 4A to FIG. 4C) are views for explaining an image captured by the imaging device 14. FIG. 4A illustrates a hemispherical image 42A captured by the lens 20A. FIG. 4B illustrates a hemispherical image 42B captured by the lens 20B. FIG. 4C illustrates a full-spherical panoramic image 42 represented by the Mercator projection.

As illustrated in FIG. 4A, the lens 20A is a fisheye lens that is one of wide angle lenses; therefore, an image obtained by the lens 20A is the curved hemispherical image 42A. Furthermore, as illustrated in FIG. 4B, the lens 20B is a fisheye lens that is one of wide angle lenses; therefore, an image obtained by the lens 20B is the curved hemispherical image 42B. Then, the hemispherical image 42A and the hemispherical image 42B are synthesized by the imaging device 14, so that the full-spherical panoramic image 42 as illustrated in FIG. 4C is generated.

Referring back to FIG. 1, when the imaging device 14 is connected to the information processing apparatus 12, the full-spherical panoramic image 42 obtained by the imaging device 14 is transmitted from the imaging device 14 to the information processing apparatus 12. In the embodiment, the imaging device 14 transmits the full-spherical panoramic image 42 to the information processing apparatus 12.

The information processing apparatus 12 acquires the full-spherical panoramic image 42 from the imaging device 14.

Then, the information processing apparatus 12 displays the acquired full-spherical panoramic image 42 on the display unit 16, the UI unit 18C, or the like using open graphic library (OpenGL).

Next, a hardware configuration of the information processing apparatus 12 will be described.

Figure 5:
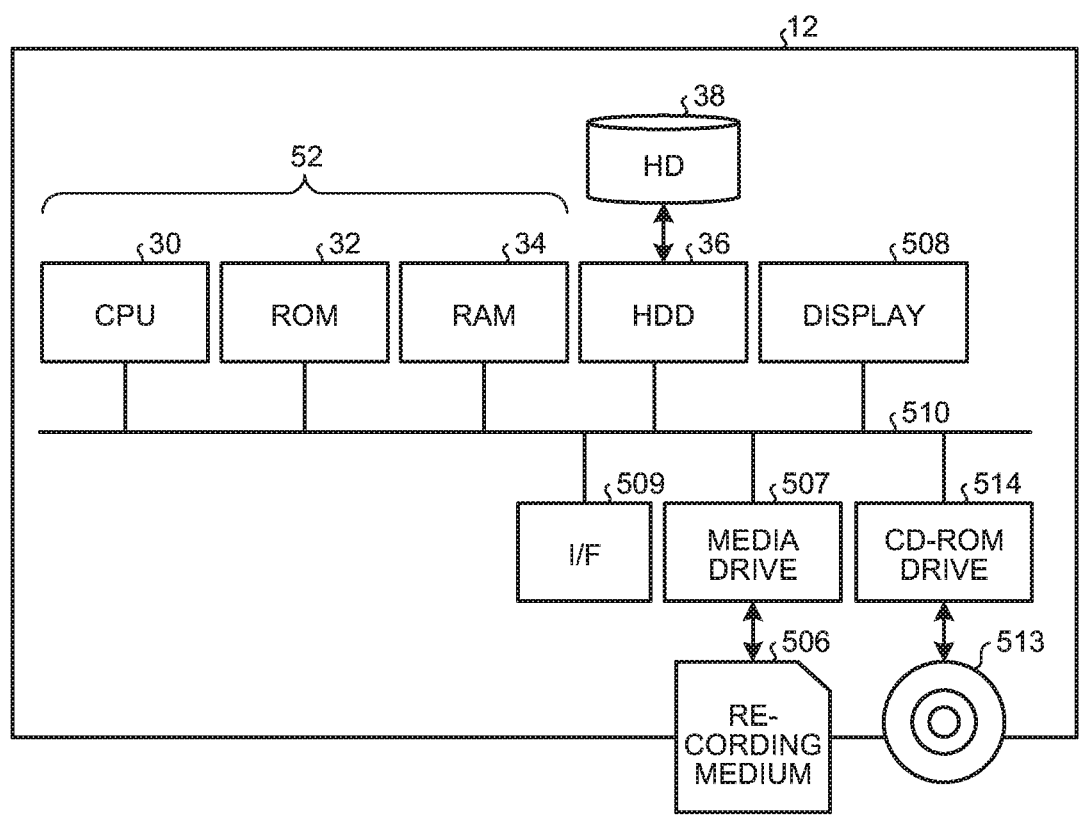
FIG. 5 is a diagram for explaining a hardware configuration of an information processing apparatus.

FIG. 5 is a diagram for explaining the hardware configuration of the information processing apparatus 12.

The information processing apparatus 12 includes a central processing unit (CPU) 30 that controls operations of the entire information processing apparatus 12, a read only memory (ROM) 32 that stores therein a program, such as initial program loader (IPL), used to drive the CPU 30, a random access memory (RAM) 34 used as a work area of the CPU 30, a hard disk (HD) 38 that stores therein various kinds of data, such as a program used for the information processing apparatus 12, and a hard disk drive (HDD) 36 that controls read and write of various kinds of data to and from the HD 38 under the control of the CPU 30.

Furthermore, the information processing apparatus 12 includes a media drive 507 that controls read and write (storage) of data to and from a recording medium 506, such as a flash memory, a display 508 that displays various images, an interface (I/F) 509 for communicating with the imaging device 14 and the operating unit 18 (the keyboard 18A, the mouse 18B, and the UI unit 18C), a compact disc read only memory (CD-ROM) drive 514 that controls read and write of various kinds of data to and from a CD-ROM 513 that is one example of a removable recording medium, and a bus line 510 that electrically connects the above-described components.

An information processing program for executing information processing performed by the information processing apparatus 12 is incorporated in the ROM 32 or any other non-volatile storage medium in advance, to be provided. Furthermore, the information processing program executed by the information processing apparatus 12 may be recorded in a computer-readable recording medium (for example, the CD-ROM 513), such as a CD-ROM, a flexible disk (FD), a compact disc recordable (CD-R), or a digital versatile disk (DVD), in a computer-installable or computer-executable file format, to be provided.

Moreover, the information processing program executed by the information processing apparatus 12 may be stored in a computer connected to a network, such as the Internet, and may be downloaded via the network, to be provided or distributed.

Furthermore, the information processing program executed by the information processing apparatus 12 may be incorporated in the ROM 32 or the like in advance, to be provided.

Next, a functional configuration of the information processing apparatus 12 will be described.

Figure 6:
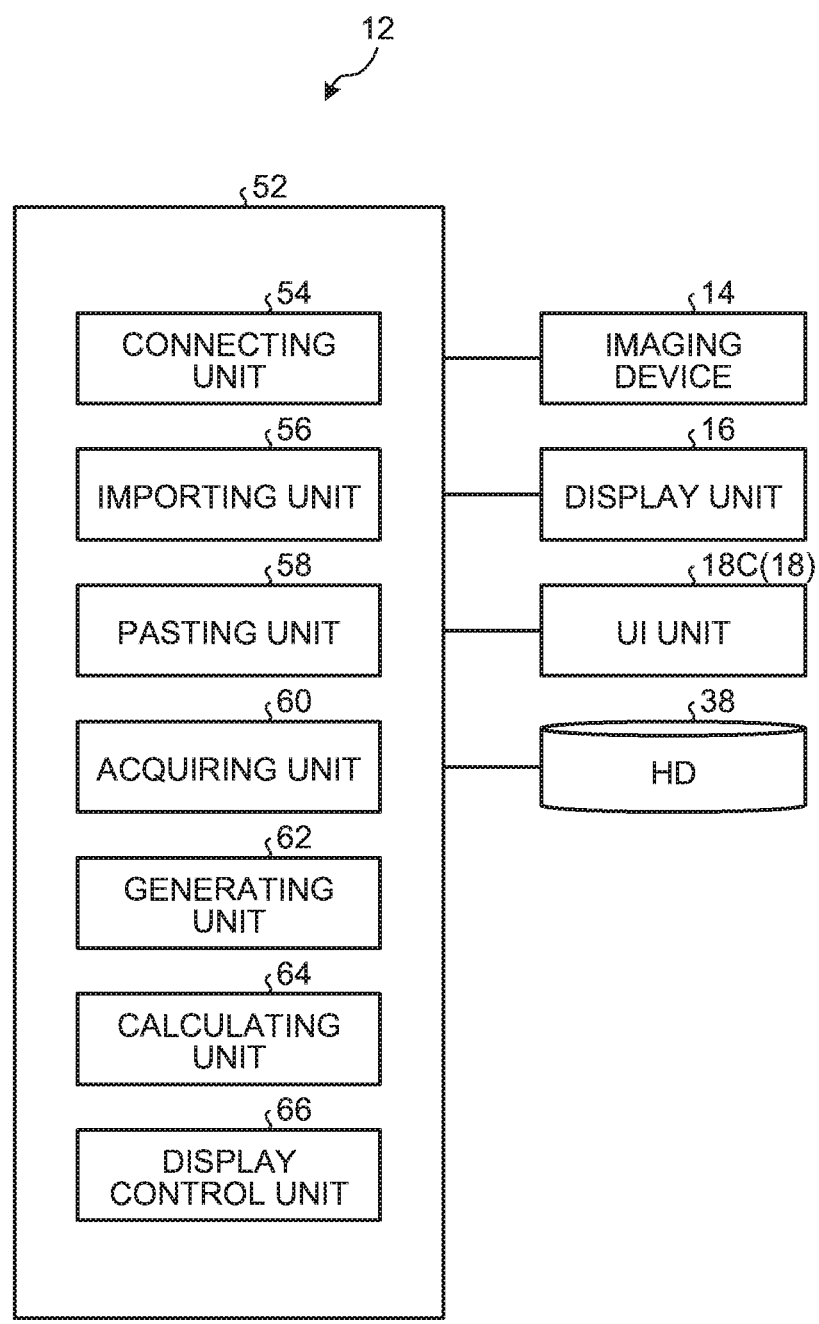
FIG. 6 is a schematic diagram illustrating a functional configuration of the information processing apparatus.

FIG. 6 is a schematic diagram illustrating the functional configuration of the information processing apparatus 12.

The information processing apparatus 12 includes a control unit 52, the operating unit 18, such as the UI unit 18C, and the HD 38. The control unit 52 is electrically connected to the imaging device 14, the display unit 16, the operating unit 18, such as the UI unit 18C, and the HD 38.

The control unit 52 is a computer that controls the entire information processing apparatus 12 and includes the CPU 30, the ROM 32, the RAM 34, or the like as described above. The control unit 52 may be constructed by a circuit or the like.

The control unit 52 includes a connecting unit 54, an importing unit 56, a pasting unit 58, an acquiring unit 60, a generating unit 62, a calculating unit 64, and a display control unit 66.

A part or all of the connecting unit 54, the importing unit 56, the pasting unit 58, the acquiring unit 60, the generating unit 62, the calculating unit 64, and the display control unit 66 may be implemented by causing a processor, such as a CPU, to execute a program, that is, by software, for example. A part or all of the connecting unit 54, the importing unit 56, the pasting unit 58, the acquiring unit 60, the generating unit 62, the calculating unit 64, and the display control unit 66 may be implemented by hardware, such as an integrated circuit (IC), or by a combination of software and hardware.

Specifically, the information processing program executed by the information processing apparatus 12 has a module structure including the above-described units (the connecting unit 54, the importing unit 56, the pasting unit 58, the acquiring unit 60, the generating unit 62, the calculating unit 64, and the display control unit 66). As actual hardware, the CPU 30 reads and executes the information processing program from a storage medium, so that the above-described units are loaded on a main storage device and generated on the main storage device.

The connecting unit 54 establishes connection to the imaging device 14. For example, the connecting unit 54 performs communication control to establish a connection in accordance with a communication protocol that is defined in advance together with the imaging device 14, when the imaging device 14 is connected to the information processing apparatus 12 in a wired or wireless manner. With this operation, the connecting unit 54 establishes connection to the imaging device 14.

The importing unit 56 imports the full-spherical panoramic image 42 from the imaging device 14. It may be possible to store, in the HD 38, the full-spherical panoramic image 42 imported from the imaging device 14. In this case, the importing unit 56 may import the full-spherical panoramic image 42 from the HD 38.

Figure 7:
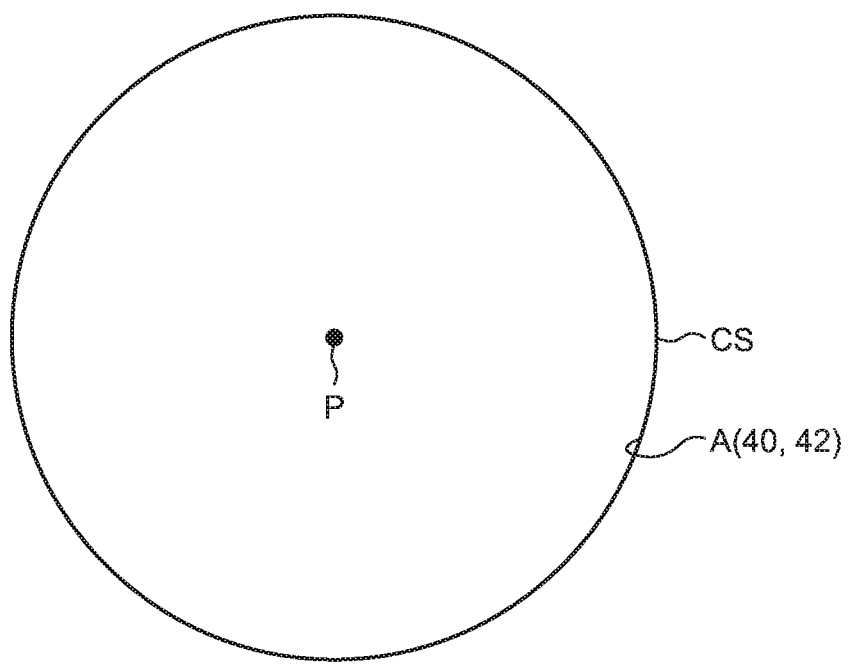
FIG. 7 is a view for explaining pasting.

The pasting unit 58 pastes the full-spherical panoramic image 42 obtained by imaging an omnidirectional range, along an inner wall of a virtual three-dimensional sphere arranged in a virtual three-dimensional space. FIG. 7 is a view for explaining pasting.

The pasting unit 58 arranges a virtual three-dimensional sphere CS in a virtual three-dimensional space. The virtual three-dimensional sphere CS may be a sphere whose cross section is perfectly circular, or an ellipsoid whose cross section is elliptical. In FIG. 7, as one example, the virtual three-dimensional sphere CS that is a sphere whose cross section is perfectly circular is illustrated.

The pasting unit 58 pastes the full-spherical panoramic image 42 on an inner wall A of the virtual three-dimensional sphere CS. The pasted full-spherical panoramic image 42 is referred to as a full-spherical panoramic image 40 in the description below. The pasting unit 58 may paste the full-spherical panoramic image 42 on the virtual three-dimensional sphere CS using a three-dimensional (3D) graphic engine, such as OpenGL.

Figure 8:
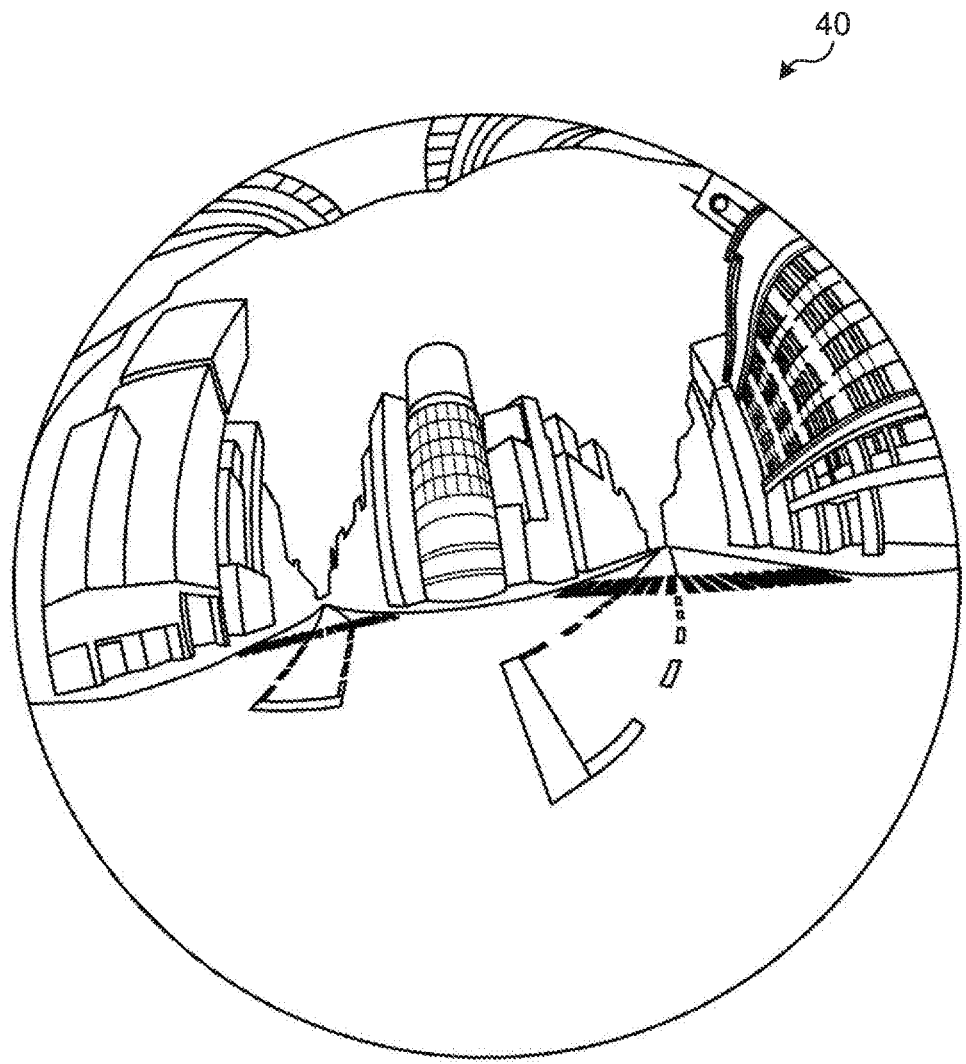
FIG. 8 is a view illustrating an example of a full-spherical panoramic image.

FIG. 8 is a view illustrating an example of the full-spherical panoramic image 40. As illustrated in FIG. 8, the full-spherical panoramic image 40 is obtained by pasting the full-spherical panoramic image 42 (see FIG. 4C) on the inner wall A of the virtual three-dimensional sphere CS. FIG. 8 illustrates the full-spherical panoramic image 40 representing a state in which the inner wall A is observed in a certain line-of-sight direction from a center point P of the virtual three-dimensional sphere CS (see FIG. 7).

Referring back to FIG. 6, the acquiring unit 60 acquires an embedding image to be embedded in the full-spherical panoramic image 42.

The embedding image may be any image to be embedded in the full-spherical panoramic image 42, and specified by an operation instruction performed on the operating unit 18 by a user. The embedding image is, for example, a character image representing a character.

The generating unit 62 generates a planar image in a form such that the embedding image is pasted on a two-dimensional plane. That is, the generating unit 62 arranges a two-dimensional plane (for example, a plate-like member) in the virtual three-dimensional space, and then pastes the embedding image on the two-dimensional plane, to generate the planar image.

Figure 9:
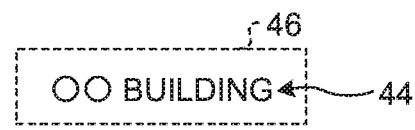
FIG. 9 is a view illustrating an example of an embedding image and a planar image.

FIG. 9 is a schematic view illustrating an example of an embedding image 44 and a planar image 46. As illustrated in FIG. 9, the embedding image 44 is, for example, a character image, such as "○○ building". The generating unit 62 generates the planar image 46 obtained by pasting the embedding image 44 on a two-dimensional plane, for example.

The acquiring unit 60 may further acquire shape information indicating a shape of the embedding image 44. For example, a user operates the UI unit 18C to input an image to be embedded and shape information indicating the shape of the embedding image 44. The acquiring unit 60 acquires the embedding image 44 that is a target image to be embedded, and the shape information from the UI unit 18C. The acquiring unit 60 may further acquire size information indicating a size of the embedding image 44. The size may be input appropriately by an operation instruction performed on the UI unit 18C by the user. The size information is information indicating a display size of the embedding image 44.

As a shape of the planar image 46, a shape in which the embedding image 44 can be accommodated is sufficient. When the acquiring unit 60 acquires the shape information indicating the shape of the embedding image 44, the generating unit 62 may generate the planar image 46 obtained by pasting the embedding image 44 on a two-dimensional plane with a shape indicated by the shape information.

Therefore, for example, if the shape information indicates a quadrilateral shape, the generating unit 62 generates the planar image 46 obtained by pasting the embedding image 44 on a quadrilateral two-dimensional plane. For another example, if the shape information indicates an elliptical shape, the generating unit 62 may generate the planar image 46 obtained by pasting the embedding image 44 is pasted on an elliptical two-dimensional plane.

Furthermore, when the acquiring unit 60 acquires the size information, the generating unit 62 may generate the planar image 46 with a display size indicated by the size information.

Referring back to FIG. 6, the calculating unit 64 calculates an arrangement position for arranging the planar image 46 closer to the center point P than the inner wall A of the virtual three-dimensional sphere CS. In this case, the calculating unit 64 calculates the arrangement position such that the planar image 46 is arranged closer to the center point P than the inner wall A of the virtual three-dimensional sphere CS (so as to be accommodated in the virtual three-dimensional sphere CS), in such an orientation that a line-of-sight direction from the center point P of the virtual three-dimensional sphere CS to the inner wall A and a perpendicular line of the planer image 46 are parallel to each other.

Figure 10:
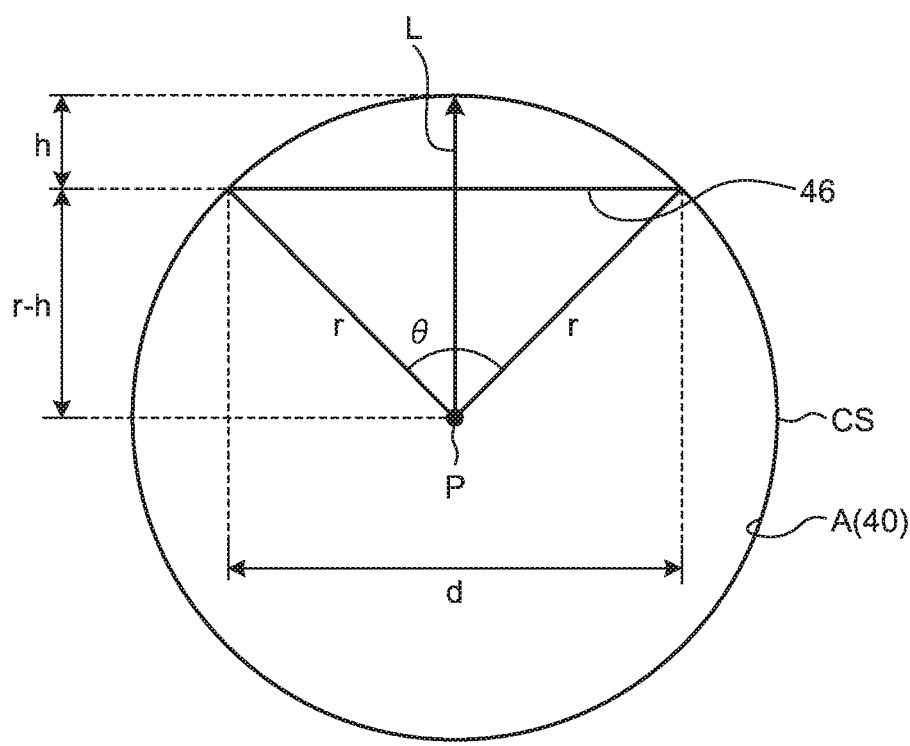
FIG. 10 is a diagram for explaining a calculation of an arrangement position.

FIG. 10 is a diagram for explaining a calculation of the arrangement position.

First, the calculating unit 64 arranges the planar image 46 such that a line-of-sight direction L from the center point P to the inner wall A and a perpendicular line of the planer image 46 are parallel to each other.

Then, the calculating unit 64 calculates how much the planar image 46 should be moved from the inner wall A to the center point P along the line-of-sight direction L to arrange the entire planar image 46 such that the entire planar image 46 is accommodated in the virtual three-dimensional sphere CS while maintaining the above-described orientation.

Specifically, the calculating unit 64 acquires a size of the planar image 46. The calculating unit 64 may acquire the size indicated by the size information acquired by the acquiring unit 60, or may acquire the size from the planar image 46 generated by the generating unit 62.

More specifically, the calculating unit 64 acquires a maximum length of the planar image 46 as a size d. The maximum length indicates a maximum length among sides and diagonal lines of the planar image 46. When the planar image 46 has a rectangular shape, the calculating unit 64 acquires a length of a diagonal line of the planar image 46 as the size d. Furthermore, when the planar image 46 has a circular shape (a true circular shape), the calculating unit 64 acquires a diameter of the planar image 46 as the size d.

Subsequently, based on a radius r of the virtual three-dimensional sphere CS and the acquired size d, the calculating unit 64 calculates an angle θ between two sides corresponding to the radius r around the center point P in a triangle formed by three sides including the two sides corresponding to the radius r and one side corresponding to the size d, in accordance with Expressions (1) and (2) below.

$$\cos\theta = (2r^2 - d^2)/2r^2 \quad (1)$$

$$\theta = \arccos((2r^2 - d^2)/2r^2) \quad (2)$$

Subsequently, based on the radius r of the virtual three-dimensional sphere CS and the calculated angle θ, the calculating unit 64 calculates a movement amount h by which the planar image 46 is to be moved from the inner wall A to the center point P along the line-of-sight direction L in accordance with Expression (3) below.

$$h = r \times (1 - \cos(\theta/2)) \quad (3)$$

Then, the calculating unit 64 calculates, as the arrangement position of the planar image 46, a position at which the planar image 46 is moved from the inner wall A toward the center point P by the movement amount h along the line-of-sight direction L (i.e., a position of (r−h) from the center point P) while maintaining the orientation in which the perpendicular line of the planer image 46 is parallel to the line-of-sight direction L.

Therefore, as illustrated in FIG. 10, the planar image 46 arranged at the calculated arrangement position (the position separated from the inner wall A by the movement amount h) is brought into a state in which the planar image 46 is accommodated in the virtual three-dimensional sphere CS, and the perpendicular line is parallel to the line-of-sight direction L. Furthermore, the planar image 46 is arranged at a position closer to the center point P than the inner wall A of the virtual three-dimensional sphere CS.

Referring back to FIG. 6, the display control unit 66 generates a display image obtained by converting a state in which the full-spherical panoramic image 40 is pasted on the inner wall A of the virtual three-dimensional sphere CS and the planar image 46 is arranged at the arrangement position calculated by the calculating unit 64, to a two-dimensional image viewed from the center point P in the line-of-sight direction L.

The conversion from the above-described state to the two-dimensional image may be performed using 3D graphic engine (OpenGL or the like).

Then, the display control unit 66 displays the generated display image on the display unit 16 or the UI unit 18C.

Figure 11:
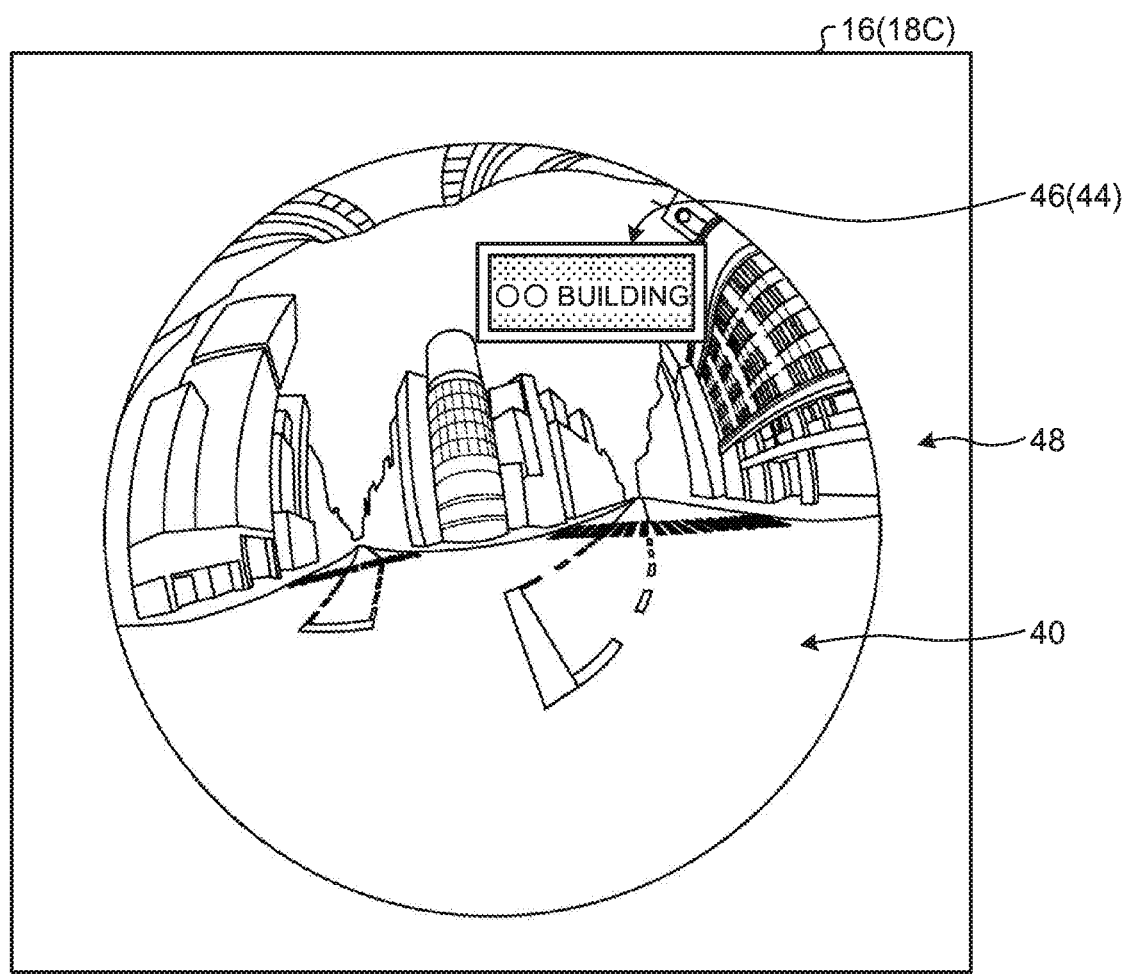
FIG. 11 is a view illustrating an example of a display image.

FIG. 11 is a view illustrating an example of a display image 48. As illustrated in FIG. 11, the display control unit 66 displays the display image 48 on the display unit 16 or the UI unit 18C.

The display image 48 is an image in which the planar image 46 obtained by pasting the embedding image 44 on a two-dimensional plane is synthesized on the full-spherical panoramic image 40.

In this example, the full-spherical panoramic image 40 is an image obtained by pasting the full-spherical panoramic image 42 on the inner wall A of the virtual three-dimensional sphere CS. Therefore, the image is distorted as compared to an actual landscape (see FIG. 11).

Here, the display image 48 is an image representing a state in which the planar image 46 obtained by pasting the embedding image 44 on a two-dimensional plane is arranged at the calculated arrangement position in the virtual three-dimensional sphere CS, in such an orientation that the line-of-sight direction L from the center point P to the inner wall A and the perpendicular line of the planer image 46 are parallel to each other, and is viewed from the center point P in the line-of-sight direction L. That is, the embedding image 44 is arranged in front of (closer to the center point P than) a three-dimensional model formed by the full-spherical panoramic image 40.

Therefore, the planar image 46 included in the display image 48 represents a state in which the planar image 46 is viewed in a perpendicular direction with respect to the line-of-sight direction L. That is, the planar image 46 is displayed without distortion.

Next, an editing process performed by the control unit 52 of the information processing apparatus 12 will be described.

Figure 12:
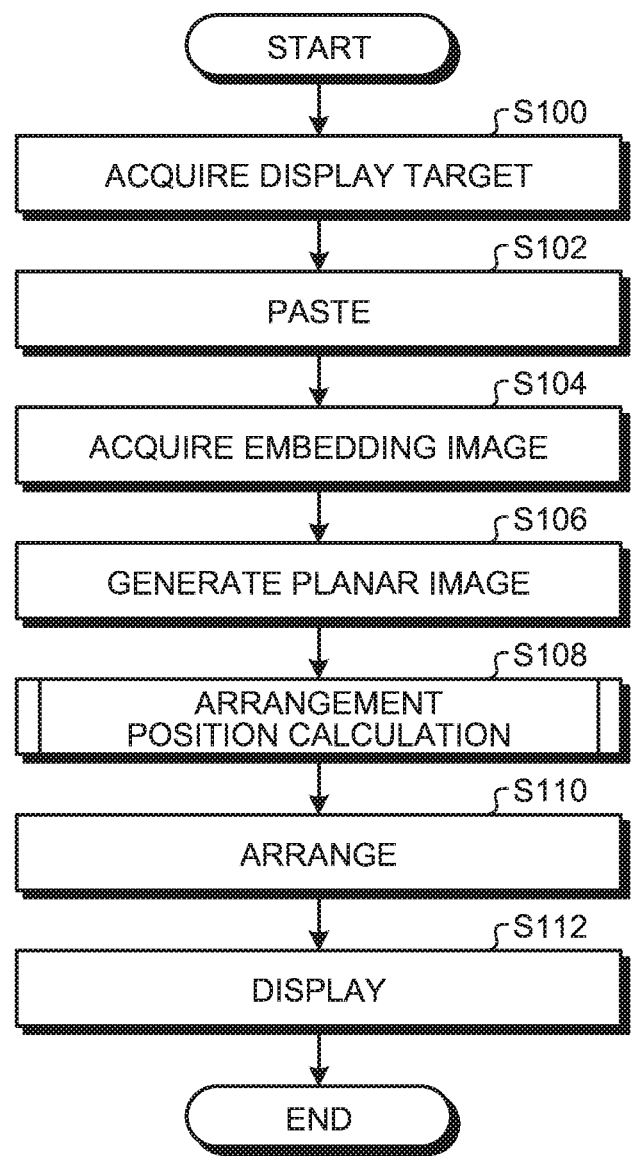
FIG. 12 is a flowchart illustrating an example of the flow of information processing.

FIG. 12 is a flowchart illustrating the flow of information processing performed by the control unit 52 of the information processing apparatus 12.

First, the importing unit 56 acquires the full-spherical panoramic image 42 to be displayed on the display unit 16 (Step S100). For example, a user operates the UI unit 18C to specify the full-spherical panoramic image 42 as a display target. The importing unit 56 acquires, from the HD 38, the full-spherical panoramic image 42 that is a display target received from the UI unit 18C. The importing unit 56 may acquire the full-spherical panoramic image 42 from the imaging device 14.

Subsequently, the pasting unit 58 pastes the full-spherical panoramic image 42 acquired at Step S100 on the inner wall A of the virtual three-dimensional sphere CS arranged in the virtual three-dimensional space (Step S102) (see FIG. 7 and FIG. 8).

Then, the acquiring unit 60 acquires the embedding image 44 to be embedded in the full-spherical panoramic image 42 (Step S104). Subsequently, the generating unit 62 generates the planar image 46 obtained by pasting the embedding image 44 on a two-dimensional plane (Step S106).

Then, the calculating unit 64 calculates an arrangement position for arranging the planar image 46 closed to the center point P than the inner wall A of the virtual three-dimensional sphere CS (Step S108) (details will be described later).

Subsequently, the display control unit 66 pastes the full-spherical panoramic image 40 on the inner wall A of the virtual three-dimensional sphere CS and arranges the planar image 46 at the arrangement position calculated at Step S108 (Step S110). Then, the display control unit 66 generates the display image 48 obtained by converting the above-described state to a two-dimensional image viewed from the center point P in the line-of-sight direction L.

Subsequently, the display control unit 66 displays the generated display image on the display unit 16 or the UI unit 18C (Step S112). Then, the routine is finished.

Figure 13:
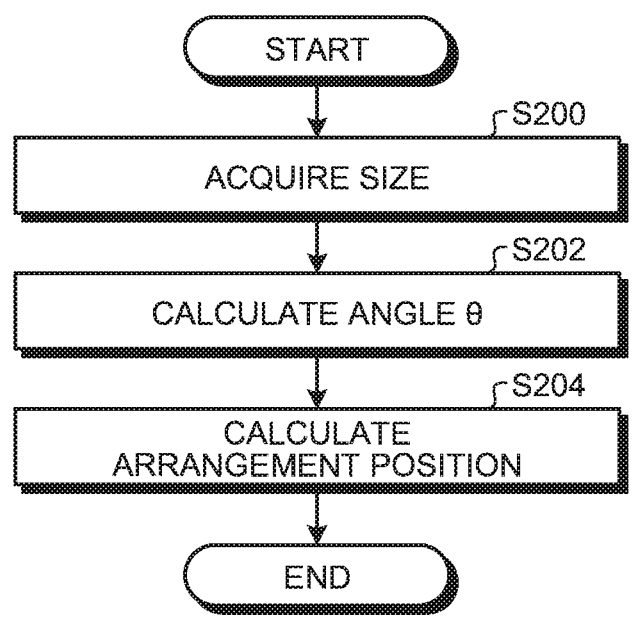
FIG. 13 is a flowchart illustrating an example of the flow of an arrangement position calculation process.

Next, an arrangement position calculation process performed at Step S108 in FIG. 12 will be described. FIG. 13 is a flowchart illustrating the flow of the arrangement position calculation process.

First, the calculating unit 64 arranges the planar image 46 such that the line-of-sight direction L from the center point P toward the inner wall A and the perpendicular line of the planer image 46 are parallel to each other. Then, the calculating unit 64 acquires a size of the planar image 46 (Step S200). For example, the calculating unit 64 acquires the maximum length of the planar image 46 as the size d.

Subsequently, the calculating unit 64 calculates the angle θ between the two sides corresponding to the radius r around the center point P in the triangle formed by three sides including the two sides corresponding to the radius r and one side corresponding to the size d, based on the radius r of the virtual three-dimensional sphere CS and the acquired size d in accordance with Expression (1) and (2) as described above (Step S202).

Then, the calculating unit 64 calculates, as the arrangement position of the planar image 46, a position at which the planar image 46 is moved from the inner wall A toward the center point P by the movement amount h along the line-of-sight direction L (i.e., the position of (r-h) from the center point P) (Step S204). Then, the routine is finished.

As described above, the information processing apparatus 12 according to the embodiment includes the pasting unit 58, the acquiring unit 60, the generating unit 62, the calculating unit 64, and the display control unit 66. The pasting unit 58 pastes the full-spherical panoramic image 42 obtained by imaging an omnidirectional range, along the inner wall A of the virtual three-dimensional sphere CS arranged in the virtual three-dimensional space. The acquiring unit 60 acquires the embedding image 44 to be embedded in the full-spherical panoramic image 42. The generating unit 62 generates the planar image 46 obtained by pasting the embedding image 44 on the two-dimensional plane. The calculating unit 64 calculates an arrangement position for arranging the planar image 46 closer to the center point P than the inner wall A of the virtual three-dimensional sphere CS, in such an orientation that the line-of-sight direction L from the center point P to the inner wall A of the virtual three-dimensional sphere CS and the perpendicular line of the planer image 46 are parallel to each other. The display control unit 66 displays, on the display unit 16, the display image 48 obtained by converting a state in which the full-spherical panoramic image 40 is obtained by pasting the full-spherical panoramic image 42 along the inner wall A of the virtual three-dimensional sphere CS and the planar image 46 is arranged at the arrangement position, to a two-dimensional image viewed from the center point P in the line-of-sight direction L.

Therefore, the planar image 46 included in the display image 48 represents a state in which the planar image 46 is viewed in a perpendicular direction with respect to the line-of-sight direction L. That is, the planar image 46 embedded in the full-spherical panoramic image 40 is displayed without distortion.

Consequently, in the information processing apparatus 12 according to the embodiment, the embedding image 44 embedded in the full-spherical panoramic image 42 can be displayed without distortion.

Conventionally, the embedding image 44 is embedded along the inner wall A on the full-spherical panoramic image 40 that is obtained by arranging the full-spherical panoramic image 42 along the inner wall A of the virtual three-dimensional sphere CS. Therefore, conventionally, the embedding image 44 is displayed in a distorted manner along the inner wall A of the virtual three-dimensional sphere CS.

In contrast, in the embodiment, the information processing apparatus 12 generates the planar image 46 obtained by pasting the embedding image 44 to be embedded in the full-spherical panoramic image 42, on a two-dimensional plane, and arranges the planar image 46 closer to the center point P than the inner wall A of the virtual three-dimensional sphere CS. Therefore, the planar image 46 embedded in the full-spherical panoramic image 40 is displayed without distortion.

Furthermore, it is preferable that the virtual three-dimensional sphere CS is a sphere whose cross section is perfectly circular or an ellipsoid whose cross section is elliptical.

Moreover, it is preferable that the embedding image 44 includes a character image.

Furthermore, the acquiring unit 60 may acquire shape information indicating a shape of the embedding image 44, and the generating unit 62 may generate the planar image 46 obtained by pasting the embedding image 44 on a two-dimensional plane with a shape indicated by the shape information.

According to an embodiment of the present invention, it is possible to display an embedding image embedded in a full-spherical panoramic image without distortion.

According to the present invention, an effect of enabling the detection error of the interval between the patch images on the secondary transfer belt to be reduced and of enabling an excellent color image having a small color shift or a small color matching variation to be obtained, is achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

10 INFORMATION PROCESSING SYSTEM
12 INFORMATION PROCESSING APPARATUS
16 DISPLAY UNIT
18C UI UNIT
58 PASTING UNIT
60 ACQUIRING UNIT
62 GENERATING UNIT
64 CALCULATING UNIT
66 DISPLAY CONTROL UNIT

What is claimed is:
1. An information processing apparatus comprising:
a memory storing computer-readable instructions; and
at least one processor configured to execute the computer-readable instructions to cause the information processing apparatus to
paste a full-spherical panoramic image along an inner wall of a virtual three-dimensional sphere arranged in a virtual three-dimensional space, the full-spherical panoramic image obtained by imaging an omnidirectional range,
acquire an embedding image to be embedded in the full-spherical panoramic image, generate a planar image obtained by pasting the embedding image on a two-dimensional plane, calculate an arrangement position for arranging the planar image closer to a center point of the virtual three-dimensional sphere than the inner wall is to the center point, in such an orientation that a line-of-sight direction from the center point to the inner wall and a perpendicular line of the planar image are parallel to each other and an entire boundary of the planar image is within the virtual three-dimensional sphere, and display a display image on a display unit, the display image being obtained by converting a state in which the full-spherical panoramic image is pasted along the inner wall of the virtual three-dimensional sphere and the planar image is arranged at the arrangement position, to a two-dimensional image viewed from the center point in the line-of-sight direction, wherein the at least one processor is configured to execute the computer-readable instructions to cause the information processing apparatus to acquire a size of the planar image, determine an insert minimum movement amount from the inner wall based on the acquired size of the planar image and calculate the arrangement position being the minimum movement amount, the size of the planar image being a maximum distance between two points on the boundary of the planar image.

2. The information processing apparatus according to claim 1, wherein the virtual three-dimensional sphere is one of a sphere whose cross section is circular and an ellipsoid whose cross section is elliptical.

3. The information processing apparatus according to claim 1, wherein the embedding image includes a character image.

4. The information processing apparatus according to claim 1, wherein the at least one processor is configured to execute the computer-readable instructions to cause the information processing apparatus to, acquire shape information indicating a shape of the embedding image, and generate the planar image obtained by pasting the embedding image on the two-dimensional plane with a shape indicated by the shape information.

5. The information processing apparatus according to claim 1, wherein the arrangement position is a position at which the planar image is moved from the inner wall towards the center point by the movement amount along the line-of-sight direction from the center point to the inner wall.

6. The information processing apparatus according to claim 1, wherein the at least one processor is configured to execute the computer-readable instructions to cause the information processing apparatus to acquire shape information of the embedding image and calculate the arrangement position further based on the acquired shape information of the embedding image.

7. An information processing method comprising:

pasting a full-spherical panoramic image along an inner wall of a virtual three-dimensional sphere arranged in a virtual three-dimensional space, the full-spherical panoramic image obtained by imaging an omnidirectional range;

acquiring an embedding image to be embedded in the full-spherical panoramic image;

generating a planar image obtained by pasting the embedding image on a two-dimensional plane;

calculating an arrangement position for arranging the planar image closer to a center point of the virtual three-dimensional sphere than the inner wall is to the center point, in such an orientation that a line-of-sight direction from the center point to the inner wall and a perpendicular line of the planar image are parallel to each other and an entire boundary of the planar image is within the virtual three-dimensional sphere, the calculating including, acquiring a size of the planar image, determining an insert minimum movement amount from the inner wall based on the acquired size of the planar image, and calculating the arrangement position being the minimum movement amount, the size of the planar image being a maximum distance between two points on the boundary of the planar image; and displaying a display image on a display unit, the display image being obtained by converting a state in which the full-spherical panoramic image is pasted along the inner wall of the virtual three-dimensional sphere and the planar image is arranged at the arrangement position, to a two-dimensional image viewed from the center point in the line-of-sight direction.

8. The method according to claim 7, wherein the acquiring acquires shape information of the embedding image and the calculating calculates the arrangement position further based on the acquired shape information of the embedding image.

9. A computer program product comprising a non-transitory computer-readable medium containing an information processing program, when executed by a computer, causes the computer to perform:

pasting a full-spherical panoramic image obtained by imaging an omnidirectional range, along an inner wall of a virtual three-dimensional sphere arranged in a virtual three-dimensional space;

acquiring an embedding image to be embedded in the full-spherical panoramic image;

generating a planar image obtained by pasting the embedding image on a two-dimensional plane;

calculating an arrangement position for arranging the planar image closer to a center point of the virtual three-dimensional sphere than the inner wall, in such an orientation that a line-of-sight direction from the center point to the inner wall and a perpendicular line of the planar image are parallel to each other and an entire boundary of the planar image is within the virtual three-dimensional sphere, the calculating including, acquiring a size of the planar image, determining an insert minimum movement amount from the inner wall based on the acquired size of the planar image, and calculating the arrangement position being the minimum movement amount, the size of the planar image being a maximum distance between two points on the boundary of the planar image; and displaying a display image on a display unit, the display image being obtained by converting a state in which the full-spherical panoramic image is pasted along the inner wall of the virtual three-dimensional sphere and the planar image is arranged at the arrangement position, to a two-dimensional image viewed from the center point in the line-of-sight direction.

10. The computer program product according to claim 9, wherein the acquiring acquires shape information of the embedding image and the calculating calculates the arrangement position further based on the acquired shape information of the embedding image.

11. An information processing apparatus comprising:
circuitry configured to cause the information processing apparatus to
- paste a full-spherical panoramic image along an inner wall of a virtual three-dimensional sphere arranged in a virtual three-dimensional space, the full-spherical panoramic image obtained by imaging an omnidirectional range,
- acquire an embedding image to be embedded in the full-spherical panoramic image,
- generate a planar image obtained by pasting the embedding image on a two-dimensional plane,
- calculate an arrangement position for arranging the planar image closer to a center point of the virtual three-dimensional sphere than the inner wall is to the center point, in such an orientation that a line-of-sight direction from the center point to the inner wall and a perpendicular line of the planar image are parallel to each other and an entire boundary of the planar image is within the virtual three-dimensional sphere, and
- display a display image on a display unit, the display image being obtained by converting a state in which the full-spherical panoramic image is pasted along the inner wall of the virtual three-dimensional sphere and the planar image is arranged at the arrangement position, to a two-dimensional image viewed from the center point in the line-of-sight direction, wherein the circuitry is configured to cause the information processing apparatus to acquire a size of the planar image, determine an insert minimum movement amount from the inner wall based on the acquired size of the planar image and calculate the arrangement position being the minimum movement amount, the size of the planar image being a maximum distance between two points on the boundary of the planar image.

* * * * *